US012395468B2

(12) United States Patent
Gundavelli et al.

(10) Patent No.: US 12,395,468 B2
(45) Date of Patent: Aug. 19, 2025

(54) TECHNIQUE FOR ELIMINATING INGRESS-PROXY IN THE MULTI-RELAY APPROACH FOR PRIVACY

(71) Applicant: Cisco Technology, Inc., San Jose, CA (US)

(72) Inventors: Sri Gundavelli, San Jose, CA (US); Eric A. Voit, Bethesda, MD (US); Pradeep K. Kathail, Los Altos, CA (US); Ali Sajassi, San Ramon, CA (US); David Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 18/146,342

(22) Filed: Dec. 23, 2022

(65) Prior Publication Data

US 2024/0039897 A1   Feb. 1, 2024

Related U.S. Application Data

(60) Provisional application No. 63/369,788, filed on Jul. 29, 2022.

(51) Int. Cl.
*H04L 9/40*   (2022.01)

(52) U.S. Cl.
CPC ...... *H04L 63/0414* (2013.01); *H04L 63/0435* (2013.01); *H04L 63/166* (2013.01)

(58) Field of Classification Search
CPC .................................................. H04L 63/0414
See application file for complete search history.

(56) References Cited

U.S. PATENT DOCUMENTS

| | | | |
|---|---|---|---|
| 8,254,382 B1 | 8/2012 | Wu et al. | |
| 9,641,434 B1 | 5/2017 | Laurence et al. | |
| 10,778,684 B2 * | 9/2020 | Gupta | ................. H04L 63/0281 |
| 2020/0068391 A1 | 2/2020 | Liu et al. | |

OTHER PUBLICATIONS

Deshmukh et al., "Location Privacy in Android Smart Phone Using Obfuscation," International Journal of Engineering Research & Technology, May 2013, pp. 1-8.
Yang et al., "A New Privacy-Preserving Authentication Anonymous Web Browsing," researchgate.net, Sep. 2018, pp. 1-14.
Zekun Zhang et al., "LPPS-AGC: Location Privacy Protection Strategy Altgeohash Coding in Location-Based Services," Hindawi, Feb. 27, 2022, pp. 1-17.

* cited by examiner

*Primary Examiner* — Simon P Kanaan
(74) *Attorney, Agent, or Firm* — Polsinelli P.C.

(57) ABSTRACT

In one aspect, a method of IP obfuscation of a user device includes receiving, over an Extendible Authentication Protocol (EAP) session between a user device and a network access point, location preferences of the user device, generating, based on the location preferences or a network policy, a geohash for the user device, identifying, for the user device, an IP anchor, sending, over the EAP session, the geohash to the user device, and receiving, from the user device, network traffic, wherein the network access point utilizes the geohash and the IP anchor to route the network traffic for the user device and obfuscate IP address of the user device from third-party access.

20 Claims, 10 Drawing Sheets

TECHNIQUE FOR ELIMINATING INGRESS-PROXY IN THE MULTI-RELAY APPROACH FOR PRIVACY

CROSS-REFERENCE TO RELATED APPLICATIONS

This application claims the benefit of priority to U.S. Provisional Patent Application No. 63/369,788, filed on Jul. 29, 2022, which is expressly incorporated by reference herein in its entirety.

TECHNICAL FIELD

The present disclosure generally relates to the field of computer networking, and more particularly to eliminating exposure of Personal Identifiable Information in a multi-relay network architecture.

BACKGROUND

MASQUE (Multiplexed Application Substrate over Quick User Datagram Protocol (UDP) Internet Connections (QUIC) Encryption) is a framework standardized in IETF that allows concurrently running multiple networking applications inside an HTTP/3 connection. For example, MASQUE can allow a QUIC client to negotiate proxying capability with an HTTP/3 server, and subsequently make use of this functionality while concurrently processing HTTP/3 requests and responses.

MASQUE design attempts to protect Personal Identifiable Information (PII) of the user, particularly the IP address of the user and websites visited by the user.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
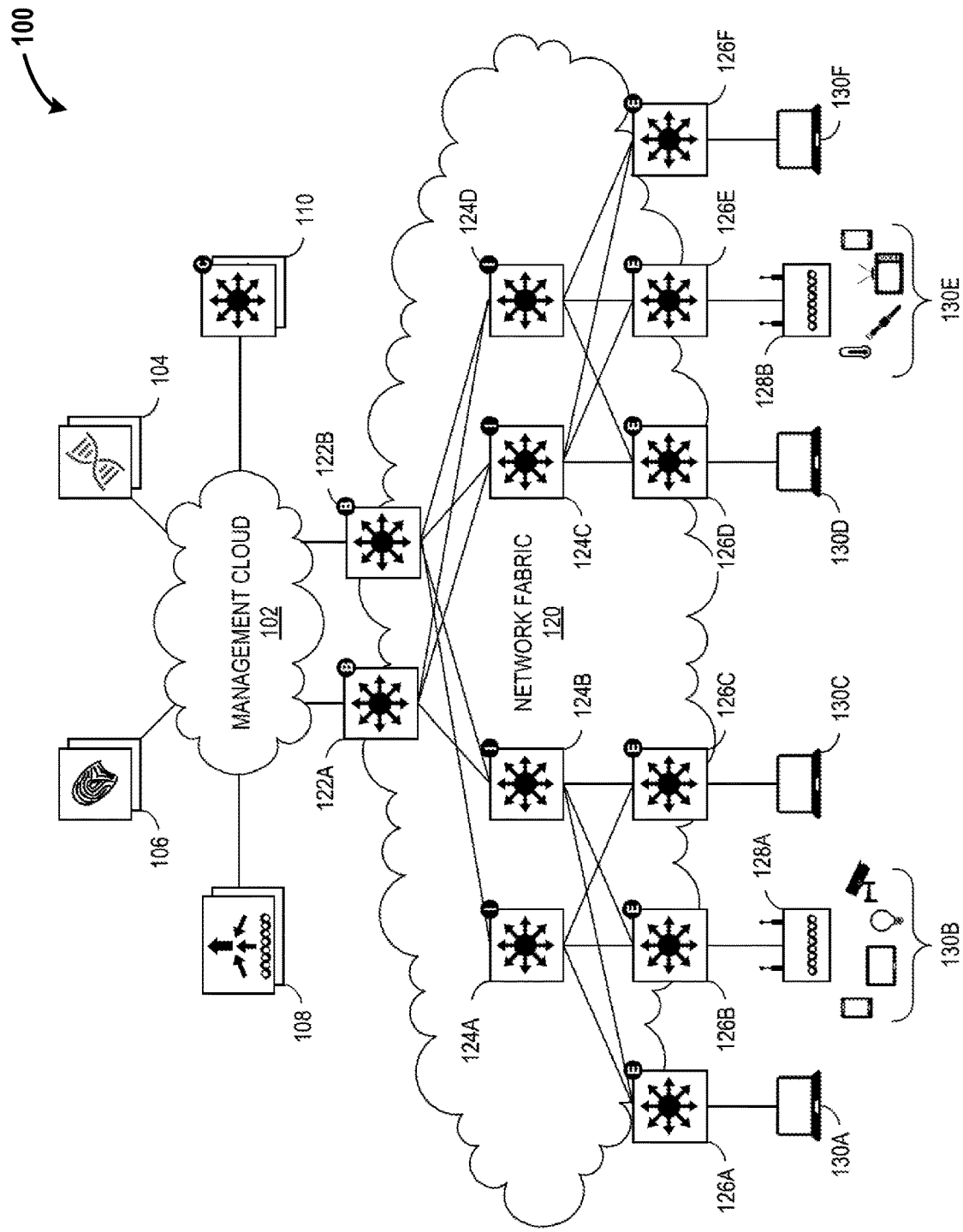
FIG. 1 illustrates an example of a physical topology of an enterprise network according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Techniques described herein solve the foregoing problems by allowing the access network elements (e.g., public or a private 5G network, or enterprise network) to absorb functionalities of a third-party ingress proxy originally defined in the MASQUE architecture into the access gateways, thus eliminating the need for a dedicated relay and simplifying the overall process. This approach results in limiting the exposure of a user's IP address to the access network. An enterprise/access network can also ensure that the location preferences of the client, or what is being exposed to the external networks is aligned with enterprise policies of the enterprise/access network.

Another advantageous aspect of the disclosed approach here is that the client device need not establish three QUIC sessions and initiate two CONNECT or CONNECT UDP triggers, thereby simplifying the process while maintaining privacy preservation and still allowing compatibility with the egress proxy of MASQUE. There are no special HTTP specific interactions with the access network; instead, the client device may use Relay-2 (the egress proxy) as the HTTP/3 proxy.

In one aspect, a method of IP obfuscation of a user device includes receiving, over an Extendible Authentication Protocol (EAP) session between a user device and a network access point, location preferences of the user device, generating, based on the location preferences or a network policy, a geohash for the user device, identifying, for the user device, an IP anchor, sending, over the EAP session, the geohash to the user device, and receiving, from the user device, a set of data for exchange between the user device and a destination point, wherein the network access point utilizes the geohash and the IP anchor to route the set of data for the user device and obfuscate IP address of the user device from third-party access.

In another aspect, the method further includes establishing a first Quick UDP Internet Connection (QUIC) session between the user device and an egress proxy, wherein the network access point provides a randomized IP address representative of the user device to the egress proxy associated with the geohash, sending, over the connection between the user device and the egress proxy, a single connection request including an IP address of a destination, the egress proxy establishing one of a Transmission Control Protocol (TCP) session or a User Datagram Protocol (UDP) session between the egress proxy and the destination, and establishing a second QUIC session between the user device and the destination through the egress proxy.

In another aspect, the method further includes facilitating, over the second QUIC session between the user device and the destination through the egress proxy, transmission of the n set of data between the user device and the destination through the network access point and the egress proxy using the geohash and the IP anchor.

In another aspect, the user device connects to the network access point using one of a 3GPP access or an IEEE 802.11-based access to the network access point, and the location preferences are included in a NAS signaling for the 3GPP access or in an 802.11 link layer protocol for the IEEE 802.11-based access.

In another aspect, the method further includes digitally signing the geohash and a Network Access Translation (NAT) translated IP address of the user device using a public key.

In another aspect, the method further includes identifying the IP anchor is location based on a location of the user device.

In another aspect, the method further includes the network access point and the IP anchor do not have visibility into the IP address of a destination to which the set of data is being sent or received from.

In one aspect, a network access point includes one or more memories having computer-readable instructions stored therein and one or more processors. The one or more processors are configured to execute the computer-readable instructions to receive, over an Extendible Authentication Protocol (EAP) session and from a user device, location preferences of the user device, generate, based on the location preferences or a network policy, a geohash for the user device, identify, for the user device, an IP anchor, send, over the EAP session, the geohash to the user device, and receive, from the user device, a set of data for exchange between the user device and a destination point, wherein the network access point is configured to utilize the geohash and the IP anchor to route the set of data for the user device and obfuscate IP address of the user device from third-party access.

In one aspect, one or more non-transitory computer-readable media include computer-readable instructions, which when executed by one or more processors of a network access point, cause the network access point to receive, over an Extendible Authentication Protocol (EAP) session and from a user device, location preferences of the user device, generate, based on the location preferences or a network policy, a geohash for the user device, identify, for the user device, an IP anchor, send, over the EAP session, the geohash to the user device, and receive, from the user device, a set of data for exchange between the user device and a destination point, wherein the network access point is configured to utilize the geohash and the IP anchor to route the set of data for the user device and obfuscate IP address of the user device from third-party access.

Example Embodiments

As noted above, MASQUE (Multiplexed Application Substrate over QUIC Encryption) is a framework standardized in IETF that allows concurrently running multiple networking applications inside an HTTP/3 connection. For example, MASQUE can allow a QUIC client to negotiate proxying capability with an HTTP/3 server, and subsequently make use of this functionality while concurrently processing HTTP/3 requests and responses.

MASQUE design marks the following two elements as Personal Identifiable Information (PII), and it attempts to protect IP Address of the User and websites visited by the User.

These are the two PII elements which are currently used for building a profile of any user on the internet. The first element identifies the user as it reflects a 1:1 relation between the user and the device. In one example, this would be the IP address, perhaps, a bad consequence of IP address preservation, a feature intended for providing IP mobility support. The IP address also identifies the physical location of the user with the availability of IP-Geo-Location database. Though not to the accuracy of what a GPS system can provide, but the entity owning the IP address and the city where the user is located is constitute a sensitive element. The IP address may also be exposed to the transport fabric and to the Websites the user visits. The second information element is related to the user's internet activity; the sites visited by the user; the DNS lookups performed by the user, duration of online activity, etc. When this information is collated with the information gleaned from sharing of cookies across websites, there is enough information to profile the user including his/her location, age, gender, marital status, income range, personal preferences, and other aspects. This information can be used for targeted advertising and can be shared with other interested parties (e.g., advertising companies).

With the private Relay/MASQUE approach, they are able to protect both of these elements using a multi-relay architecture with each relay being operated by a different entity. For example, an external entity (entity-1) may be operating the first relay, and Entity-2, large CDN provider (entity-2) may be operating the second relay. User's HTTP request are routed through these two separate internet relays to ensure no single entity will have exposure to both PII elements. The entity that has awareness to the IP address (e.g., entity-1) has no awareness on the user's internet activity and the entity (e.g., Relay-2) that has awareness of the user's internet activity has no awareness of the user's IP address. The approach of selective/partial PII leakage, necessitated by the nature of TCP/IP communications, can bring a layer of privacy to the current internet architectures, and improve user privacy.

Techniques described herein solve the foregoing problems by allowing the access network elements (e.g., public or a private 5G network, or enterprise network) absorb the Relay-1 functionality defined in the MASQUE architecture into the access gateways, thus eliminating the need for a dedicated relay (e.g., relay-1). Furthermore, this approach results in limiting the exposure of a user's IP address to the access network. An enterprise/access network can also ensure that the location preferences of the client, or what is being exposed to the external networks is aligned with the enterprise policies. In some embodiments, location preferences of the client can include location visibility preferences that dictate what aspects of the client's location will be visible to external entities. Another advantageous aspect of the disclosed approach here is that the client device need not having establish three QUIC sessions and initiate two CONNECT or CONNECT UDP triggers. There are no special HTTP specific interactions with the access network. The client device may use Relay-2 as the HTTP/3 proxy.

FIG. 1 illustrates an example of a physical topology of a network 100, that can be an enterprise network, for providing intent-based networking. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

The network 100 includes a network management system 102 and a network fabric 120. Although shown as an external network or cloud to the network fabric 120 in this example, the network management system 102 may alternatively or additionally reside on the premises of an organization or in a colocation center (in addition to being hosted by a cloud provider or similar environment). The network management system 102 can provide a central management plane for building and operating the network fabric 120. The network management system 102 can be responsible for forwarding configuration and policy distribution, as well as device management and analytics. The network management system 102 can comprise one or more network controller appliances 104, one or more authentication, authorization, and accounting (AAA) appliances 106, one or more wireless local area network controllers (WLCs) 108, and one or more fabric control plane node(s) 110. In other embodiments, one or more elements of the network management system 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
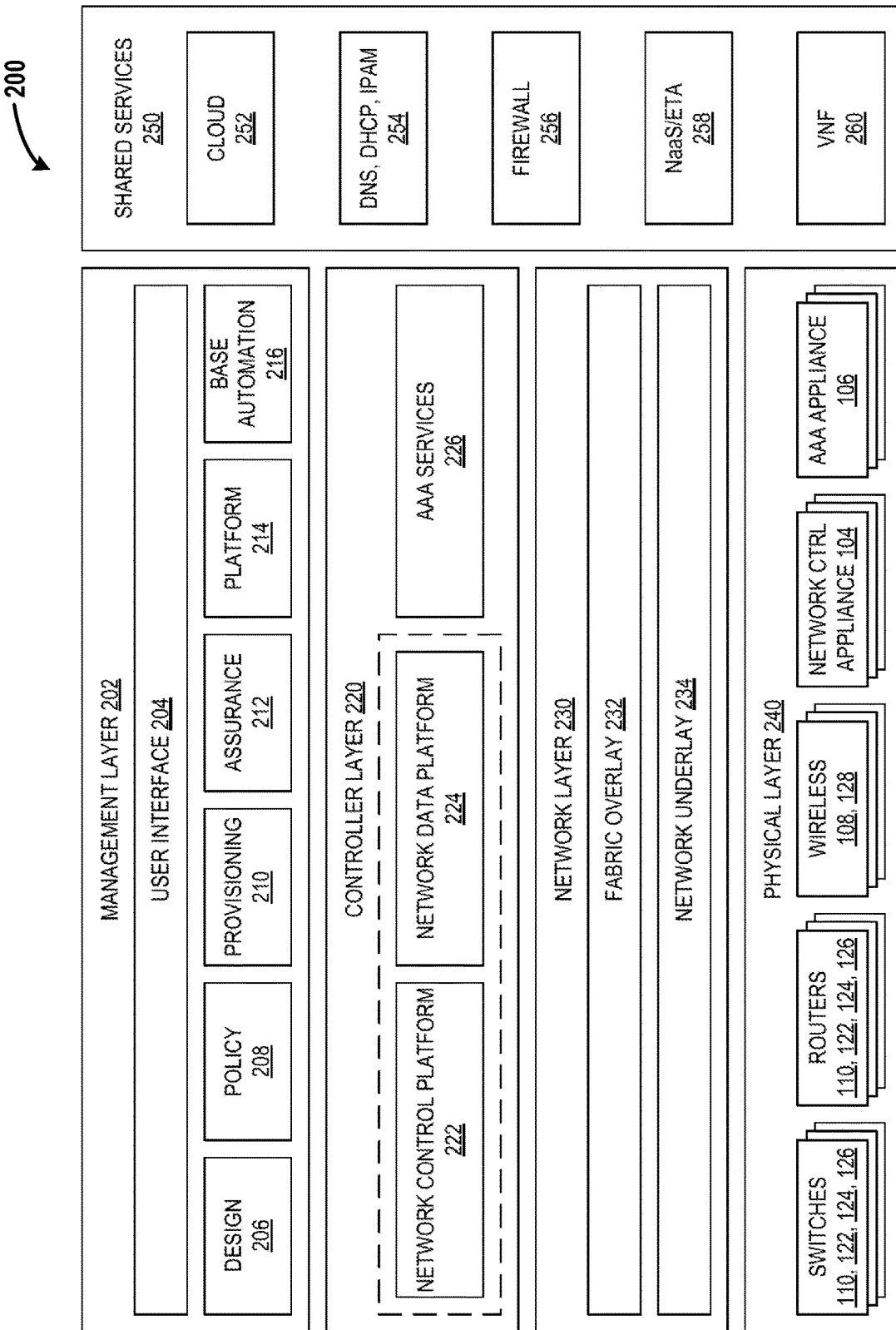
FIG. 2 illustrates an example of a logical architecture for an enterprise network according to some aspects of the present disclosure.

FIG. 2 illustrates an example of a logical architecture 200 for the network 100 (e.g., an enterprise network), according to some aspects of the present disclosure. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage the network 100 (e.g., an enterprise network). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

With example network topologies and architectures described above with reference to FIGS. 1 and 2, the disclosure now turns to example embodiments that provide improvements over the MASQUE design, as described above.

Figure 3A:
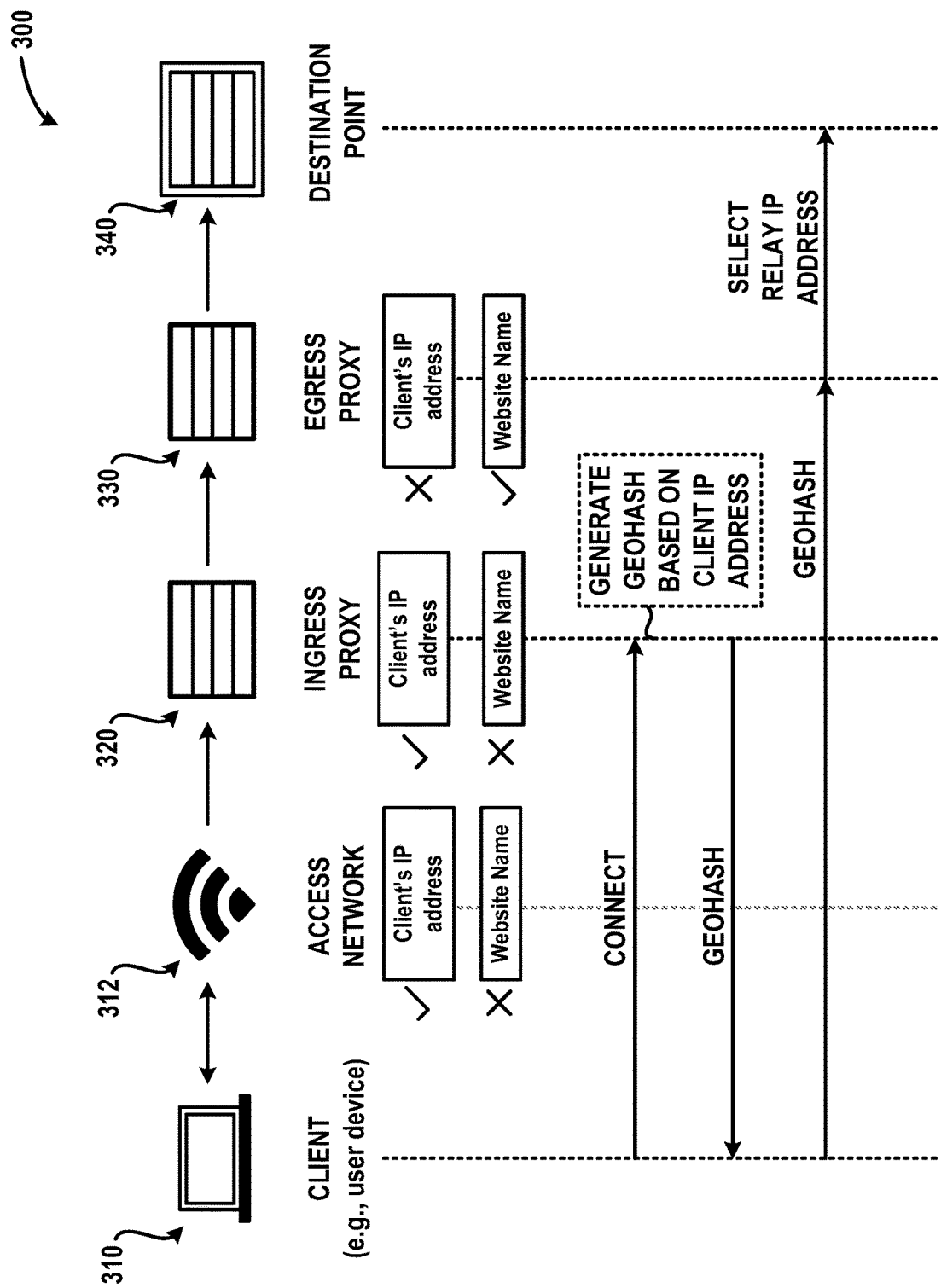
FIG. 3A illustrates an example of a current relay approach according to some aspects of the present disclosure.

FIG. 3A shows a current multi-relay architecture 300 according to current implementations of MASQUE. The multi-relay architecture 300 of current implementations can include, among other known or to be developed components, an access network 312 that facilitates connection between a client 310 (e.g., the user device, which can be the same as endpoints 130 described above) and a first relay, called an "ingress proxy" 320. The ingress proxy 320 may be operated by a first third-party entity. The ingress proxy 320 can receive IP address information about the client 310 from the access network 312 but is unaware of the destination address(es) being visited by the client 310. The ingress proxy 320 communicates with a second relay called an "egress proxy" 330, which is often operated by a second third-party entity, usually a content delivery network (CDN) provider. The egress proxy 330 may receive information about the user's internet activity but may not be aware of the user's IP address. Finally, the client 310 can connect to a destination point 340 (e.g., a server hosting the website to be visited by the client 310) through the egress proxy 330. As such, current implementations of MASQUE route HTTP requests from users through these two separate internet relays (e.g., the ingress proxy 320 and the egress proxy 330) to ensure no single entity has exposure to both PII elements described above. This approach may have the shortcomings enumerated above.

Figure 3B:
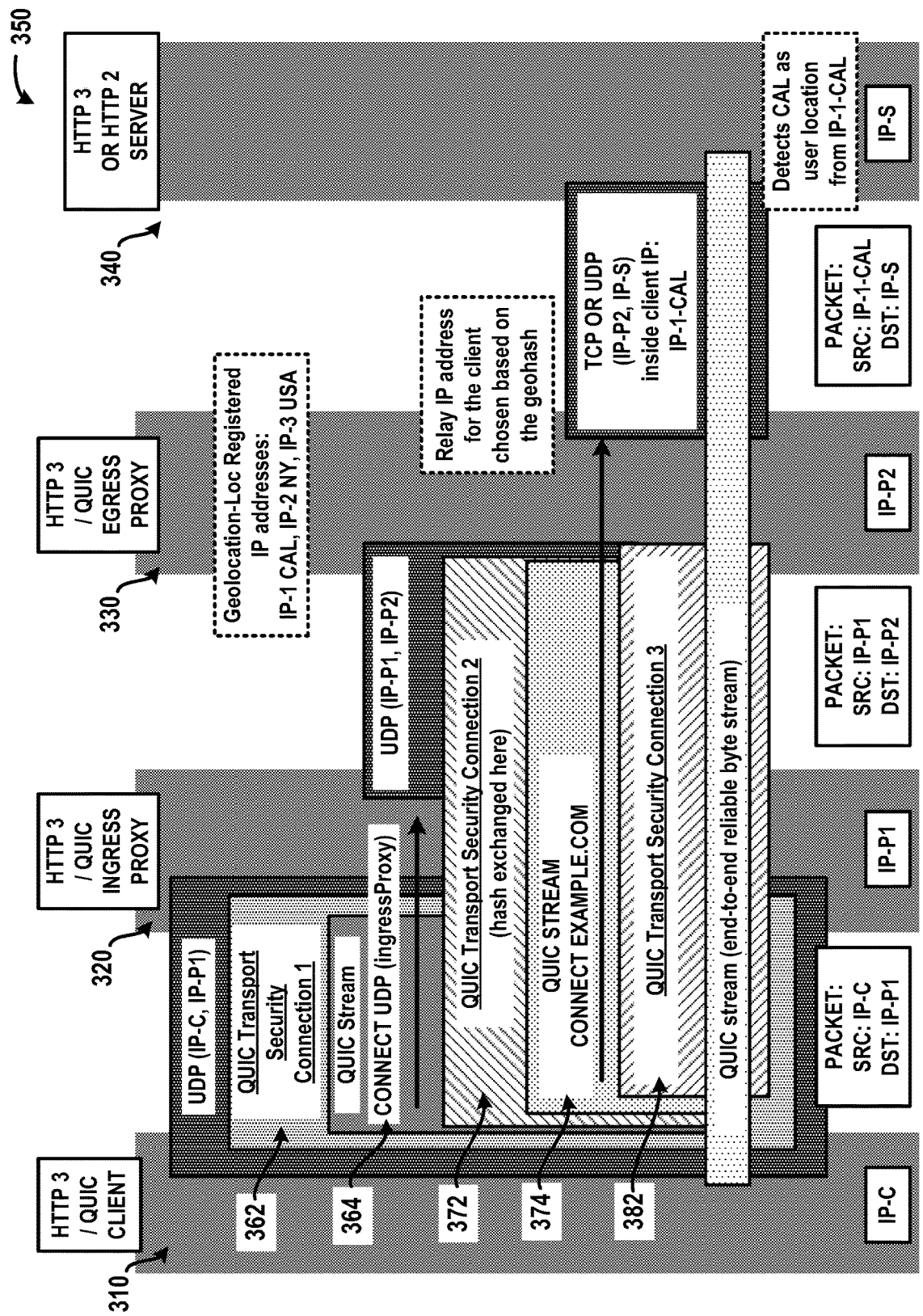
FIG. 3B illustrates an example call flow for the current MASQUE approach shown in FIG. 3A according to some aspects of the present disclosure.

FIG. 3B is a diagram 350 illustrating a session facilitated by the current multi-relay architecture 300 of FIG. 3A. With reference to FIG. 3A, the client 310 first establishes a first QUIC session 362 between the user device 310 (client 310 and user device 310 may be used interchangeably throughout the present disclosure) and the ingress proxy 320 over the access network 312. The ingress proxy 320 and the access network 312 both may have knowledge of the IP address of the client 310. The ingress proxy 320 can generate a hash based on the IP address of the client 310 with a destination address of a destination point 340 being encrypted. The client 310 then establishes a second QUIC session 372 between the client 310 and the egress proxy 330 which requires a first connection request 364 (e.g., a CONNECT or CONNECT UDP trigger) from the client 310 and where the client 310 connects to the egress proxy 330 using the hash. The egress proxy 330 assigns a relay IP address based on the hash and completes the connection between the ingress proxy 320 and the egress proxy 330. Finally, the egress proxy 330 facilitates a third QUIC session 382 between the client 310 and the destination point 340 using the encrypted destination address that requires a second connection request 374 (e.g., a CONNECT or CONNECT UDP trigger) from the client 310. The client 310 and the destination point 340 exchange a set of data for exchange between the user device and the destination point (e.g., network traffic information, which can include internet content being exchanged between the client 310 and the destination point 340 for display at an internet browser application of the client 310).

As shown in FIG. 3A, in the current private/multi relay approach 300, the ingress proxy 320 (e.g., the first relay, which may be operated by a third party) has visibility into the client's IP address. This IP address along with the client preferences are explicitly signaled over HTTP/3 by the client to the ingress proxy 320. The constructed hash provided by the ingress proxy 320 is based on this information. While this approach leaks few additional PII elements to the ingress proxy 320, it also can also lead to very inefficient routing as the IP topological anchor in the access network may not be aligned with the IP anchor assigned for the session leading to zig-zag routing.

Further, widespread use of MASQUE according to the current multi-relay architecture 300 of FIG. 3A and diagram 350 of FIG. 3B described above can have adverse effects on network traffic flows as all network traffic is funneled to a limited number of ingress proxies and thereafter to a small number of egress proxies.

Therefore, it is advantageous to hide the client's IP address, and the location preferences from the ingress proxy 320 as shown above. Location preferences can include location visibility preferences that dictate what aspects of the location of the client can be made visible to external entities. Furthermore, it is also advantageous to indicate preferences of the client (e.g., client 310) to the access network as part of the Network attach preferences. This can allow the access network to select an IP anchor (e.g. a 5G user plane function (UPF)) topologically aligned with the client's preferences, and furthermore enable IP obfuscation on all traffic and/or select traffic to the relay. The allocated IP address for the client, or the obfuscated IP address in the access network for that client, when used for generating location hash can result in a GeoHash that aligns with the preferences configured in the end device (e.g., client 310). With this approach, the leakage of the two PII elements to the first third-party entity can be eliminated and furthermore the client's preferences on the scope of location exposure can be preserved. What is known to the access network in both the approaches continues to remain the same. Further, elimination of the ingress proxy 320 can eliminate a potential bottleneck/point of failure. A non-limiting example of such approach is described below with reference to FIGS. 4A and 4B.

Figure 4A:
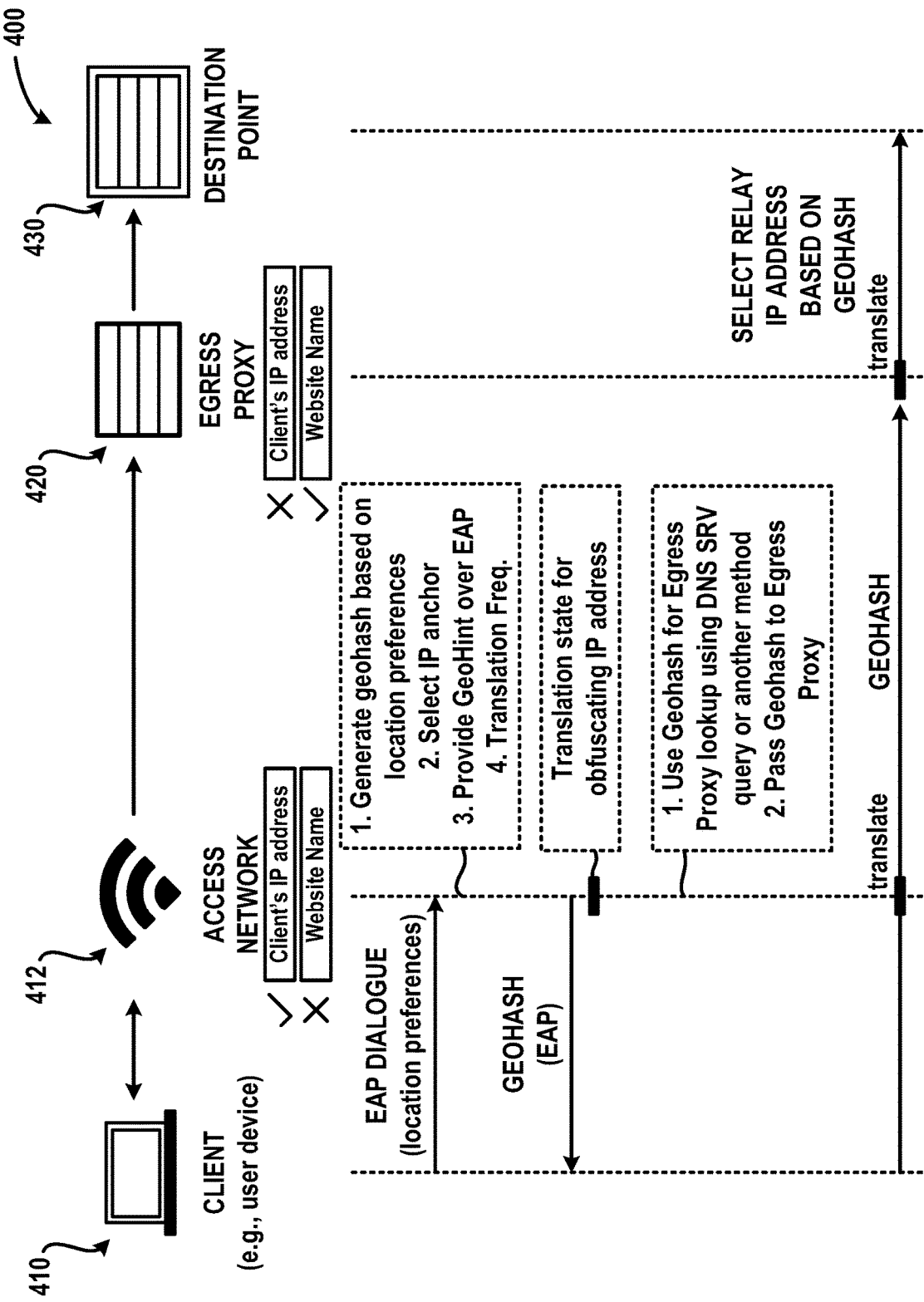
FIG. 4A illustrates an example of a relay approach according to some aspects of the present disclosure.

FIG. 4A shows an improved single-relay architecture 400 for a simplified implementation of MASQUE. The single-relay architecture 400 includes an access network (e.g., hereinafter represented by network access point 412) that facilitates connection between a client 410 (which may be the same as client 310 of FIG. 3A) and an egress proxy 420, eliminating the ingress proxy 320 discussed above with reference to FIG. 3A. Such access network may include, in addition to network access point 412, any other known or to be developed component and element for providing network access to end devices such as client 410. The egress proxy 420 can be operated by a content delivery network (CDN) provider. The network access point 412 may have the IP address information about the client 410 but may be unaware of the destination addresses being visited by the user. The egress proxy 420 receives information about the user's internet activity without awareness of the user's IP address. Finally, the client 410 can connect to a destination point 430 through the egress proxy 420. As such, the single-relay architecture 400 routes HTTP requests from users through a single internet relay (e.g., the egress proxy 420, without the ingress proxy 320) to ensure no single entity has exposure to both PII elements.

Figure 4B:
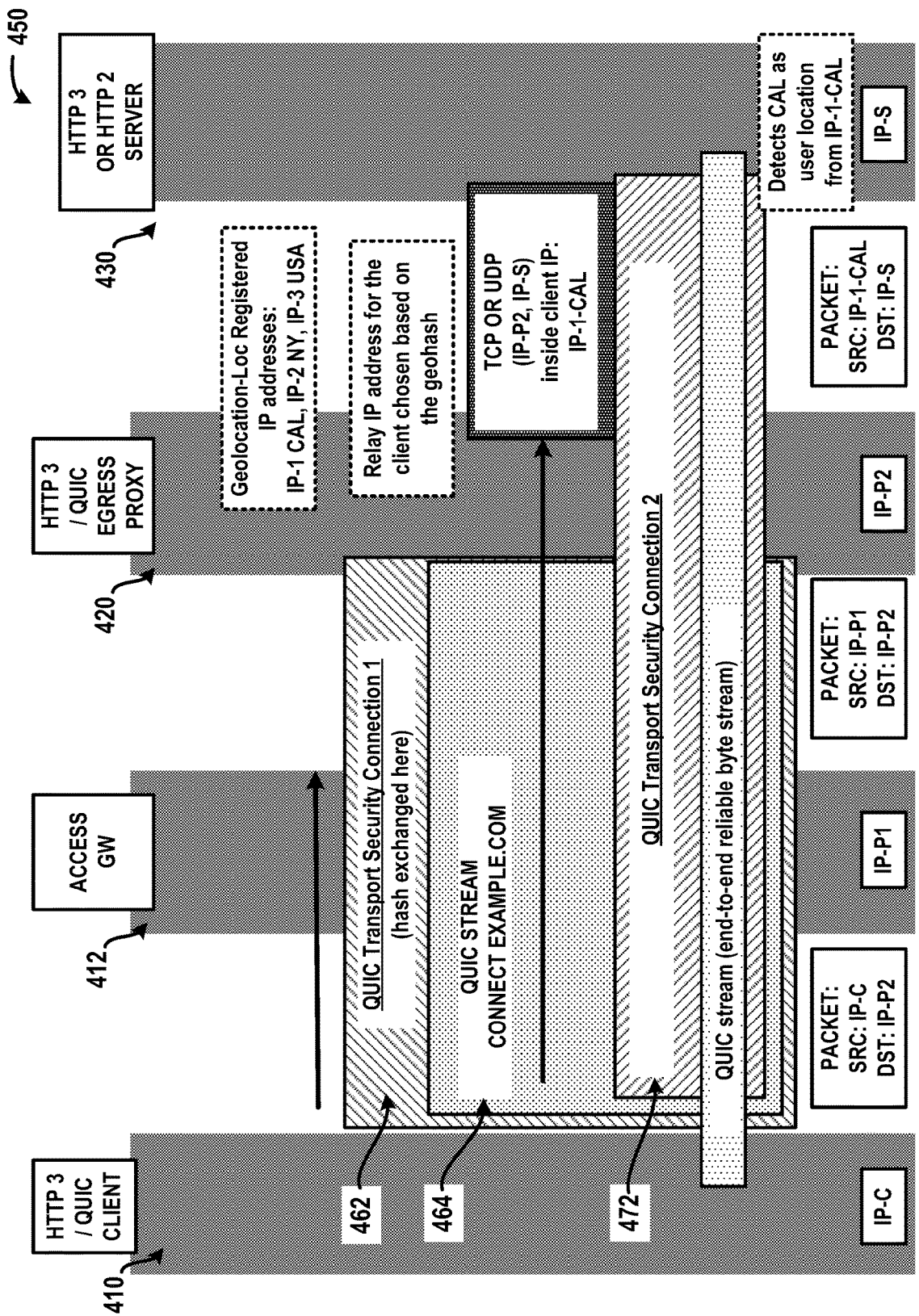
FIG. 4B illustrates an example call flow for the relay approach shown in FIG. 4A according to some aspects of the present disclosure.

FIG. 4B is a diagram 450 illustrating a session facilitated by the single-relay architecture 400 of FIG. 4A. With additional reference to FIG. 4A, the network access point 412 may receive location preferences of the client 410. In one example, location preferences may be received over an Extendible Authentication Protocol (EAP) session between the client 410 and the network access point 412, and can include location visibility preferences that dictate what aspects of the location of the client 410 can be made visible to external entities. The network access point 412 can generate, based on location preferences and/or a network policy expressed by the client 410, a geohash for the client 410 and identify an IP anchor for the client 410. The network access point 412 can identify the IP anchor for the client 410 by searching a database that connects IP prefixes to civic-locations with an IP address and retrieving a location where the IP address is hosted from. In some embodiments, there may be a single IP anchor associated with various IP prefixes with different civic-location scopes. For example, a first IP Prefix P1, can be registered as global, and a second IP prefix P2 can be associated with a particular city. Based on the client's location preferences, the network access point 412 can assign an IP address from the corresponding prefix or pool of prefixes. In some embodiments, one or more IP anchors may be associated with different locations. For example, cellular operators have gateways in different locations. The allocation logic of the gateways can be based on the client preferences. The network access point 412 can then send the geohash to the client 410 to enable direct connection of the client 410 with the egress proxy 420, eliminating exposure of the IP address or geographic location of the client 410 to third-party entities associated with the ingress proxy 320 of FIG. 3A.

The client 410 can establish a first QUIC session 462 between the client 410 and the egress proxy 420 over the network access point 412. The network access point 412 has knowledge of the IP address of the client 410, and can generate the geohash based on the IP address of the client 410 as discussed above. The egress proxy 420 may assign a relay IP address based on the geohash and complete the connection between the client 410 and the egress proxy 420.

Finally, the client 410 can establish a second QUIC session 472 between the client 410 and the destination point 430 using a single connection request 464 (e.g., a single CONNECT or CONNECT UDP trigger). The second QUIC session 72 may be used by the client 410 and the destination point 430 to exchange a set of data between the user device and the destination point (e.g., network traffic information, which can include internet content being exchanged between the client 410 and the destination point 430 for display at an internet browser application of the client 410).

In the current multi-relay architecture 300 of FIG. 3A and as shown in the diagram 350 of FIG. 3B, the client 310 has three QUIC sessions: 1) the first QUIC session 362 from client 310 to ingress proxy 320, 2) the second QUIC session 372 from client 310 to egress proxy 330, and 3) the third QUIC session 382 from client 310 to destination point 340. This method also requires the first connection request 364 establishing a connection from the ingress proxy 320 to the egress proxy 330 and the second connection request 374 establishing a connection from the egress proxy 330 to the destination point 340. In contrast, in the single-relay architecture 400 of FIG. 4A and as shown in the diagram 450 of FIG. 4B, there are two QUIC sessions: 1) the first QUIC session 462 from client 410 to egress proxy 420, and 2) the second QUIC session 472 from client 410 to destination point 430, and requires the single connection request 464 establishing a connection from the egress proxy 420 to the destination point 430. Furthermore, there is no HTTP state/proxy function required in the network access point 412.

With this approach, the network access point 412 (e.g., public or a private 5G network, or enterprise network) can absorb the functionality of the ingress proxy 320 (Relay-1) presently defined in the current multi-relay architecture 300 of FIG. 3A, eliminating the need for a dedicated relay. Furthermore, this approach results in limiting the exposure of IP address to the network access point 412 and simplifies the MASQUE functionality by requiring fewer connections between third-parties. An enterprise network can also ensure that the location preferences of the client 410, or what is being exposed to the external networks, is aligned with the enterprise policies and eliminates the exposure of this information to additional third parties that would normally operate the ingress proxy 320.

Another advantageous aspect of the disclosed approach is the client 410 is not having three QUIC sessions and not initiating two CONNECT or CONNECT UDP triggers. There are no special HTTP specific interactions with the network access point 412. The client 410 can use the egress proxy 420 as the HTTP/3 proxy.

In some examples, the client 410 as part of the access authentication can express the location preferences, which can be part of location settings that the user has configured on the client 410 which can include a mobile device. The location preferences can include location visibility preferences that dictate what aspects of the location of the client 410 can be made visible to external entities. The setting, "Maintain General Location", or "Use Country and timezone" etc., are indicated in the link-layer protocols as in type value.

In some examples, when the network access point 412 is a 3GPP Private/Public 5G network, the client 410 can include these parameters including location preferences in a NAS signaling from the user device to the network access point 412. In another art, when the access network is IEEE 802.11 based network, the client can include these parameters in the 802.11 link-layer protocols (e.g., ANQP). In another art, these parameters can be included in authentication protocols, such EAP, or address configuration procedures such as DHCP/IPv6 ND.

In some examples, the network access point 412 on receiving the location preference from the client 410 may verify the location preferences against an enterprise policy configured by an enterprise network in communication with or otherwise including or being part of the network access point 412. The network access point 412 generates a location hash (e.g., a geohash) and a network access translation (NAT) of the IP address of the client 410 that is aligned with the client request and/or with the enterprise policy. The geohash, along with the NAT'd public IP address of the client 410 can be cryptographically and/or digitally signed using a public key of the network access point 412. The signed location hash is delivered to the client 410 over the respective access network protocols listed above (e.g., 3GPP Private/Public 5G network, 802.11 link-layer protocols, etc.). Furthermore, the network access point 412 can deliver the IP address of the egress proxy 420 to the client 410 to enable the client 410 to establish the first QUIC session 462 with the egress proxy 420.

In some examples, the network access point 412 can select an IP anchor topologically aligned with the location preferences of the client 410 and can enable NAT on the session (e.g., yielding an obfuscated IP address, which can be a NAT'd public IP address or an otherwise randomized IP address). When presented to a Geo-Location hash function of the network access point 412, the obfuscated IP address for the client's session can present Geo-location coordinates aligned with the client's location settings. If the network access point 412 is a 5G network, the selected IP anchor can be a user plane function (UPF) including a local UPF or a central UPF. For Wi-Fi based systems, the selected IP anchor may be a Wi-Fi controller which can find similar alignment with the location settings.

In some examples, the client 410 can connect to the egress proxy 420 by establishing a HTTP/3 session. The IP address seen by the egress proxy 420 can be an obfuscated IP address (e.g., the NAT'd public IP address or the otherwise randomized IP address), but the geohash on the obfuscated IP address can confirm to client's location preferences.

In some examples, the client 410 may secure the transport to the egress proxy 420 using QUIC security/TLS. The path between the client 410 and the egress proxy 420 is secured upon establishment of the first QUIC session 462. The client 410 for browsing the internet can send the single connection request 464 (e.g., an HTTP/3 CONNECT UDP or CONNECT trigger or message) with the URL of the destination. This may trigger the egress proxy 420 to set up a TCP session or a UDP session with the destination point 430 based on the supported destination server's supported HTTP version 2, or 3 (e.g., a TCP session for HTTP/2 or a UDP session for HTTP/3).

In some examples, the network access point 412 may have visibility into the URL that the client is visiting, or on the IP destinations; likewise, the egress proxy 420 may not have visibility into the client's IP address. In some examples, as one additional step, the client 410 can indicate a frequency of IP rotation to the network access point 412.

In some examples, the above described examples provide several optimizations over and greatly simplify the MASQUE approach and bring enterprise elements into the equation.

Figure 5A:
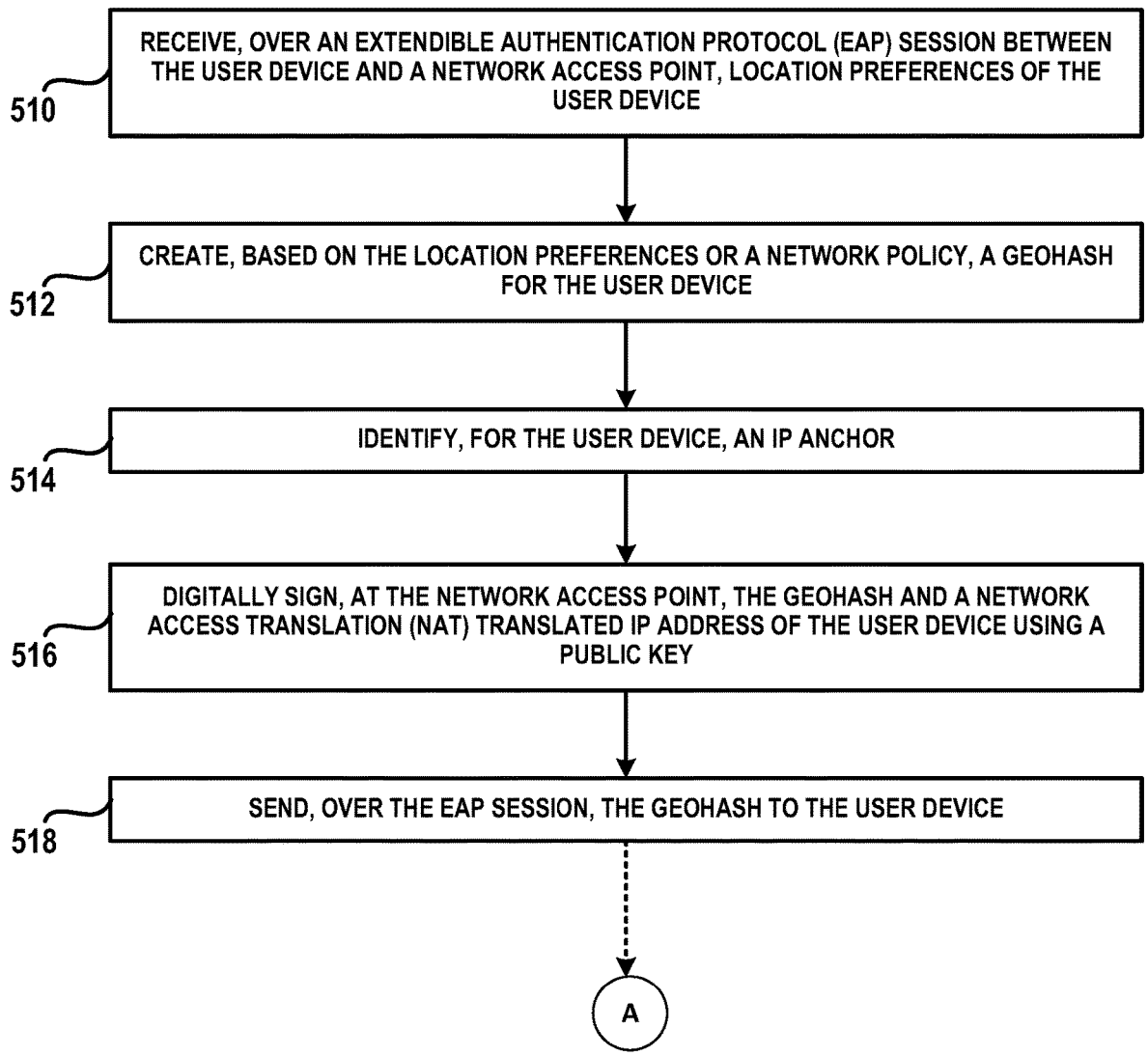
FIG. 5A illustrates various steps of eliminating exposure of Personal Identifiable Information in a multi-relay network architecture according to some aspects of the present disclosure.
Figure 5B:
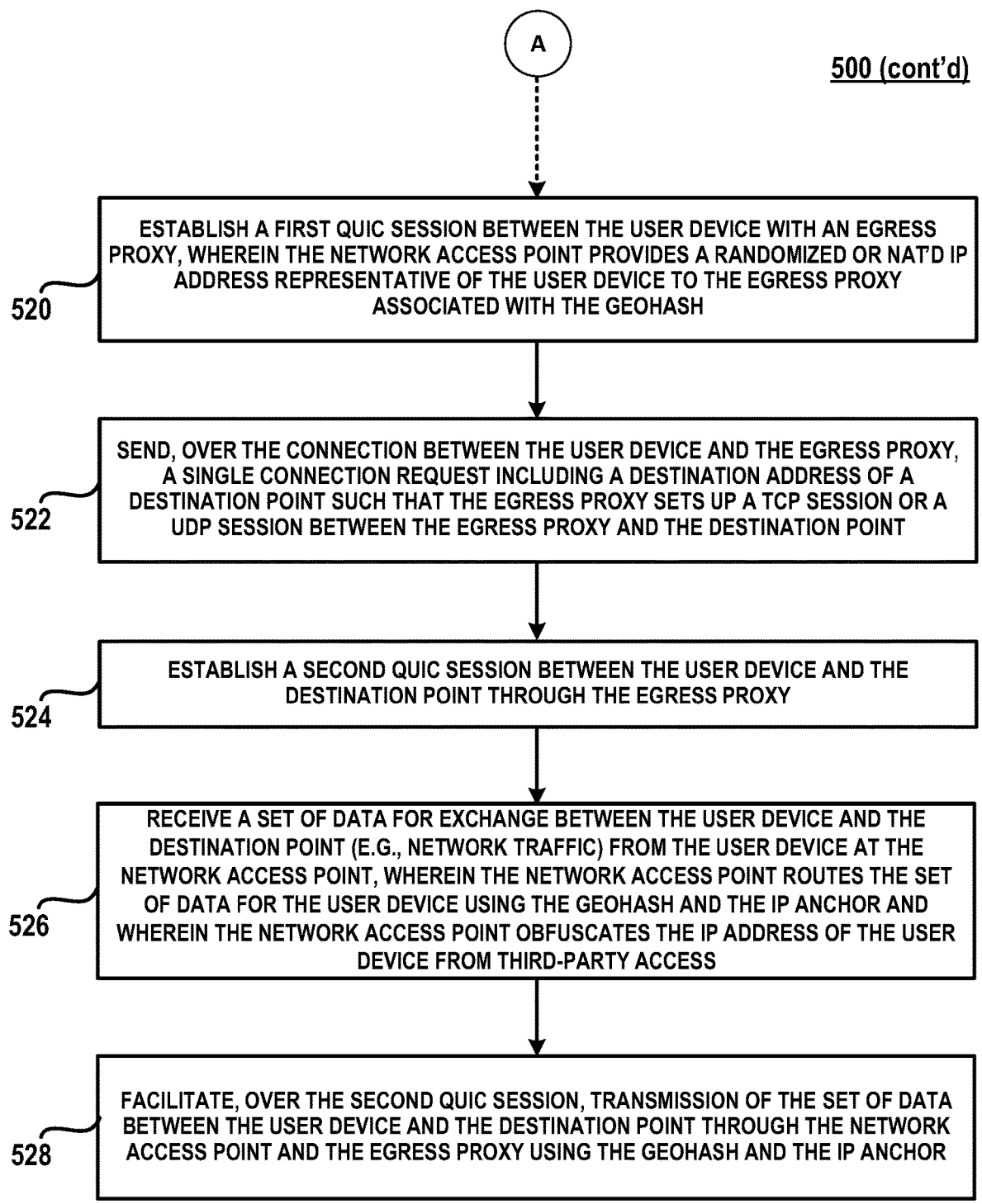
FIG. 5B further illustrates various steps of the method of FIG. 5A according to some aspects of the present disclosure.

FIGS. 5A and 5B illustrate a method 500 for facilitating connection between a client (e.g., a user device) and a destination point according to systems and methods discussed herein with respect to FIGS. 4A and 4B.

At step 510, network access point 412, may receive, over an Extendible Authentication Protocol (EAP) session between the user device (e.g., the client 410) and the network access point 412, location preferences of the user device as shown and discussed above with reference to FIG. 4A. In one example, location preferences can include location visibility preferences, which includes information about how the user and/or associated enterprise network wants to express their location, which can include a geolocation of the user or of the network. The location preferences can include indications to limit exposure of geographical location, such as only showing a general region rather than a more specific town or city. Generally, the location preferences of the user device can be dictated by location settings that the user and/or enterprise network has configured on the user device. In one example, the location settings, "Maintain General Location", or "Use Country and time-zone", etc., can be indicated in the link-layer protocols as in type value.

Next, network access point 412 may generate a geohash for the user device as further shown and discussed above in FIG. 4A. In one example, generating the geohash can include steps 512, 514, and 516.

At step 512, network access point 412 creates a geohash for the user device according to any know or to be developed process of creating a geohash based on the identifying information of the user device, network policies, and/or the location preferences received at step 510.

At step 514, the network access point 412 can identify, for the user device, an IP anchor that is topologically aligned with the location preferences and/or the network policy. In one example, the network access point 412 can include 5G components of a 5G network. In this case, the IP anchor can be a local UPF or a central UPF that is topologically aligned with the location preferences and/or the network policy. In another example, if the network access point 412 includes Wi-Fi components of a WiFi network, the IP anchor can be a Wi-Fi controller that is topologically aligned with the location preferences and/or the network policy.

At step 516, the network access point 412 can digitally sign the geohash and a Network Access Translation (NAT) translated IP address of the user device using a public key.

At step 518, the network access point 412 can send, over the EAP session, the geohash to the user device (e.g., the client 410).

FIG. 5B includes further steps of method 500.

At step 520, and with additional reference to FIG. 4B discussed above, the network access point 412 can establish the first QUIC session 462 between the user device and the egress proxy 420. At this step, the network access point 412 can provide the geohash and/or a randomized or NAT'd IP address representative of the user device to the egress proxy 420. As shown in FIG. 4B, the egress proxy 420 can select a relay IP address for the user device based on the provided geohash.

At step 522, and as further shown in FIG. 4B, the access network 412 can send, over the connection between the user device and the egress proxy 420, the single connection request 464 (e.g., a single HTTP/3 CONNECT UDP or CONNECT trigger or message) including a destination address of the destination point 430 such that the egress proxy 420 sets up a TCP session or a UDP session between the egress proxy 420 and the destination point 430.

At step 524, and as further shown in FIG. 4B, the network access point 412 can establish the second QUIC session 472 between the user device and the destination point 430 through the egress proxy 420.

At step 526, the network access point 412 can receive the set of data for exchange between the user device and the destination point (e.g., network traffic) from the user device at the network access point, and can route the set of data to the egress proxy 420 for the user device using the geohash and the IP anchor such that the IP address of the user device is obfuscated from third-party access and such that information pertaining to the destination point 430 is obfuscated from the network access point 412.

At step 528, the network access point 412 can facilitate, over the second QUIC session 472, transmission of the set of data between the user device and the destination point 430 through the egress proxy 420 using the geohash and the IP anchor.

Figure 6:
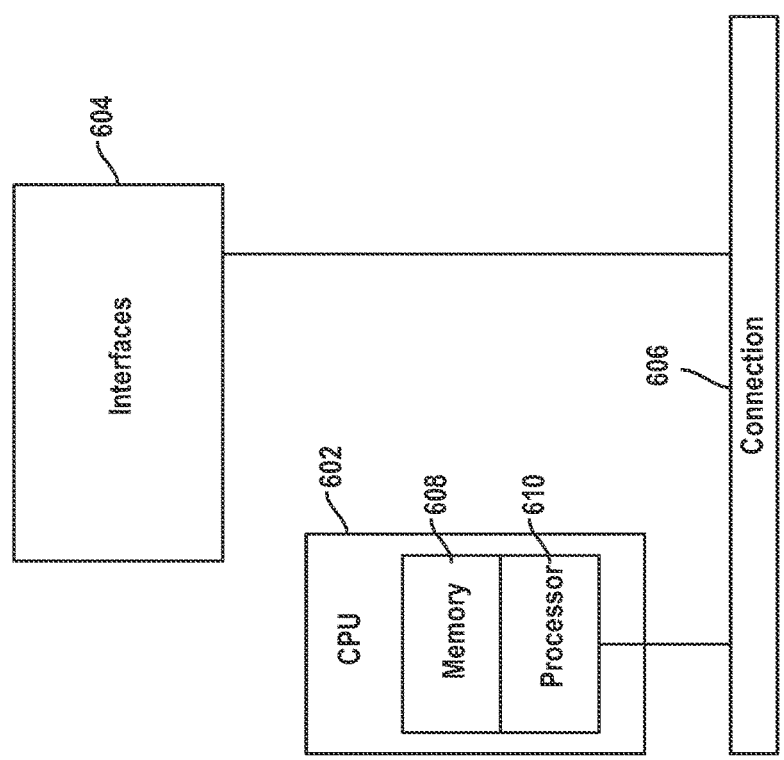
FIG. 6 illustrates an example of a network device according to some aspects of the present disclosure.

FIG. 6 illustrates an example of a network device, according to some aspects of the present disclosure. Network device 600 can be a network appliance implementing the functionalities of MASQUE and/or the network access point 412, among other components described above with reference to FIGS. 1-4B. The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7:
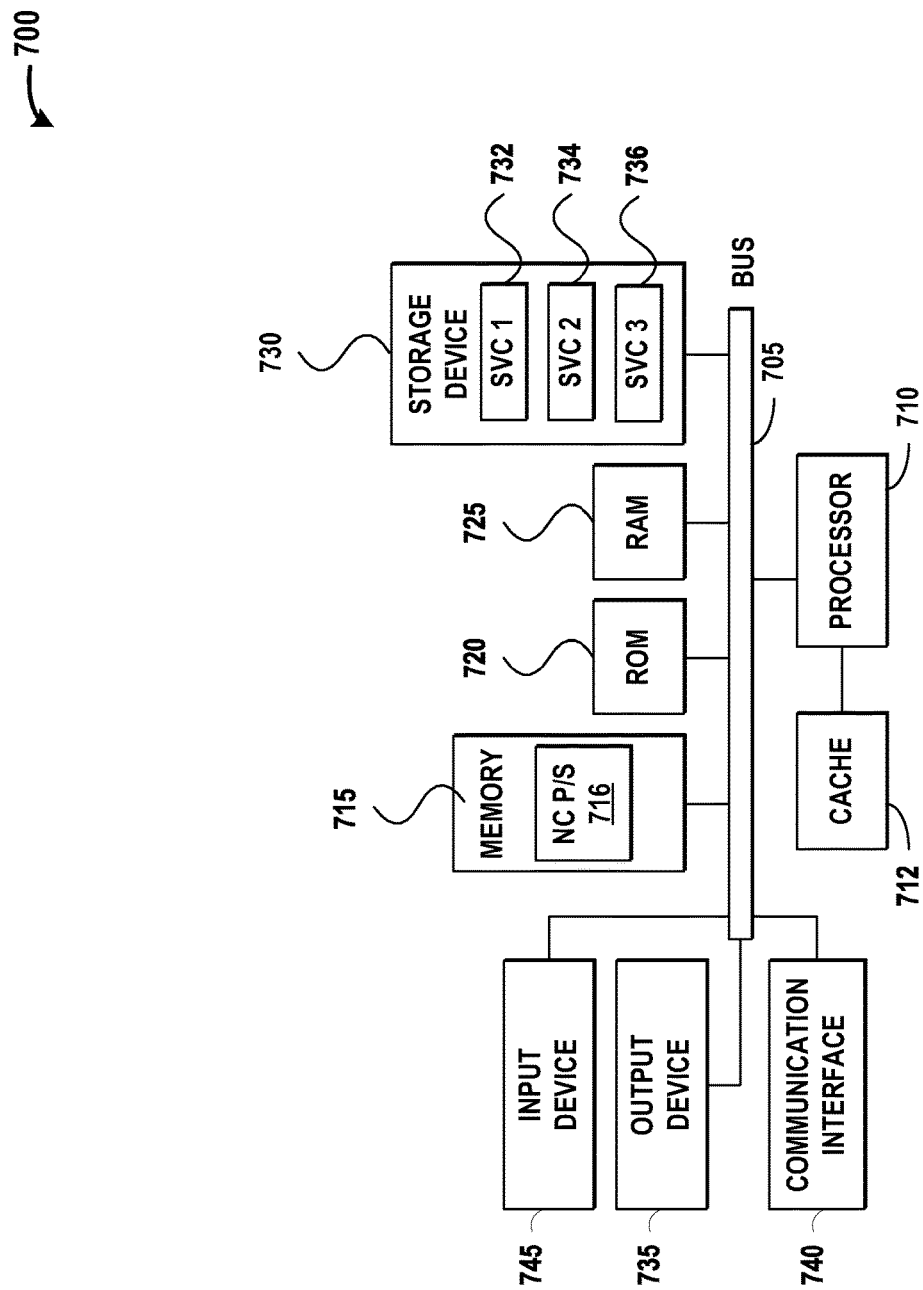
FIG. 7 illustrates an example of a bus computing system according to some aspects of the present disclosure.

FIG. 7 illustrates an example of a bus computing system, according to some aspects of the present disclosure. Computing system 700 can be utilized as part of any one of the network components described above with reference to FIGS. 1-4B and 6. Further, aspects of computing system 700 can be employed to apply aspects of method 500 shown in FIGS. 5A and 5B, which corresponds to various steps and functionalities outlined above with respect to FIGS. 3B and 4B. Components of the computing system 700 are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module (services), such as services SVC 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function. In a further aspect, the memory 715 and/or the storage device 730 can also include network connection processes/services (abbreviated as NC P/S) 716 that includes instructions, which, when executed by the processor 710, cause the processor 710 to implement various functionalities discussed above and shown in FIGS. 3B, and 4B-5B including aspects of method 500.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general-purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method of IP obfuscation of a user device, comprising:
   receiving, over an Extendible Authentication Protocol (EAP) session between a user device and a network access point, location preferences of the user device;
   generating, based on the location preferences or a network policy, a geohash for the user device;
   identifying, for the user device, an IP anchor;
   sending, over the EAP session, the geohash to the user device; and
   receiving, from the user device, a set of data for exchange between the user device and a destination point, wherein the network access point utilizes the geohash and the IP anchor to route the set of data for the user device and obfuscate IP address of the user device from third-party access.

2. The method of claim 1, further comprising:
   establishing a first Quick UDP Internet Connection (QUIC) session between the user device and an egress proxy, wherein the network access point provides a randomized IP address representative of the user device to the egress proxy associated with the geohash;
   sending, over the connection between the user device and the egress proxy, a single connection request including an IP address of a destination, the egress proxy establishing one of a Transmission Control Protocol (TCP) session or a User Datagram Protocol (UDP) session between the egress proxy and the destination; and
   establishing a second QUIC session between the user device and the destination through the egress proxy.

3. The method of claim 2, further comprising:
   facilitating, over the second QUIC session between the user device and the destination through the egress proxy, transmission of the set of data between the user device and the destination through the network access point and the egress proxy using the geohash and the IP anchor.

4. The method of claim 1, wherein the user device connects to the network access point using one of a 3GPP access or an IEEE 802.11-based access to the network access point, and wherein the location preferences are included in a NAS signaling for the 3GPP access or in an 802.11 link layer protocol for the IEEE 802.11-based access.

5. The method of claim 1, further comprising:
   digitally signing the geohash and a Network Access Translation (NAT) translated IP address of the user device using a public key.

6. The method of claim 1, wherein identifying the IP anchor is based on a location of the user device.

7. The method of claim 1, wherein the network access point and the IP anchor do not have visibility into the IP address of a destination to which the set of data is being sent or received from.

8. A network access point, comprising:
one or more memories having computer-readable instructions stored therein; and
one or more processors configured to execute the computer-readable instructions to:
receive, over an Extendible Authentication Protocol (EAP) session and from a user device, location preferences of the user device;
generate, based on the location preferences or a network policy, a geohash for the user device;
identify, for the user device, an IP anchor;
send, over the EAP session, the geohash to the user device; and
receive, from the user device, a set of data for exchange between the user device and a destination point, wherein the network access point is configured to utilize the geohash and the IP anchor to route the set of data for the user device and obfuscate IP address of the user device from third-party access.

9. The network access point of claim 8, wherein the one or more processors are configured to execute the computer-readable instructions to:
establish a first Quick UDP Internet Connection (QUIC) session between the user device and an egress proxy, wherein the network access point provides a randomized IP address representative of the user device to the egress proxy associated with the geohash;
send, over the connection between the user device and the egress proxy, a single connection request including an IP address of a destination, the egress proxy establishing one of a Transmission Control Protocol (TCP) session or a User Datagram Protocol (UDP) session between the egress proxy and the destination; and
establish a second QUIC session between the user device and the destination through the egress proxy.

10. The network access point of claim 9, wherein the one or more processors are configured to execute the computer-readable instructions to facilitate, over the second QUIC session between the user device and the destination through the egress proxy, transmission of the set of data between the user device and the destination through the network access point and the egress proxy using the geohash and the IP anchor.

11. The network access point of claim 8, wherein the user device is configured to connect to the network access point using one of a 3GPP access or an IEEE 802.11-based access to the network access point, and wherein the location preferences are included in a NAS signaling for the 3GPP access or in an 802.11 link layer protocol for the IEEE 802.11-based access.

12. The network access point of claim 8, wherein the one or more processors are configured to execute the computer-readable instructions to digitally sign the geohash and a Network Access Translation (NAT) translated IP address of the user device using a public key.

13. The network access point of claim 8, wherein identifying the IP anchor is based on a location of the user device.

14. The network access point of claim 8, wherein the network access point and the IP anchor do not have visibility into the IP address of a destination to which the set of data is being sent or received from.

15. One or more non-transitory computer-readable media comprising computer-readable instructions, which when executed by one or more processors of a network access point, cause the network access point to:
receive, over an Extendible Authentication Protocol (EAP) session and from a user device, location preferences of the user device;
generate, based on the location preferences or a network policy, a geohash for the user device;
identify, for the user device, an IP anchor;
send, over the EAP session, the geohash to the user device; and
receive, from the user device, a set of data for exchange between the user device and a destination point, wherein the network access point is configured to utilize the geohash and the IP anchor to route the set of data for the user device and obfuscate IP address of the user device from third-party access.

16. The one or more non-transitory computer-readable media of claim 15, wherein the execution of the computer-readable instructions further cause the network access point to:
establish a first Quick UDP Internet Connection (QUIC) session between the user device and an egress proxy, wherein the network access point provides a randomized IP address representative of the user device to the egress proxy associated with the geohash;
send, over the connection between the user device and the egress proxy, a single connection request including an IP address of a destination, the egress proxy establishing one of a Transmission Control Protocol (TCP) session or a User Datagram Protocol (UDP) session between the egress proxy and the destination; and
establish a second QUIC session between the user device and the destination through the egress proxy.

17. The one or more non-transitory computer-readable media of claim 16, wherein the execution of the computer-readable instructions further cause the network access point to facilitate, over the second QUIC session between the user device and the destination through the egress proxy, transmission of the set of data between the user device and the destination through the network access point and the egress proxy using the geohash and the IP anchor.

18. The one or more non-transitory computer-readable media of claim 15, wherein the user device is configured to connect to the network access point using one of a 3GPP access or an IEEE 802.11-based access to the network access point, and wherein the location preferences are included in a NAS signaling for the 3GPP access or in an 802.11 link layer protocol for the IEEE 802.11-based access.

19. The one or more non-transitory computer-readable media of claim 15, wherein the execution of the computer-readable instructions further cause the network access point to digitally sign the geohash and a Network Access Translation (NAT) translated IP address of the user device using a public key.

20. The one or more non-transitory computer-readable media of claim 15, wherein the network access point and the IP anchor do not have visibility into the IP address of a destination to which the set of data is being sent or received from.

* * * * *